United States Patent
Miura et al.

(10) Patent No.: US 6,832,428 B2
(45) Date of Patent: Dec. 21, 2004

(54) TOOL AND PROCESS FOR PRESS-FITTING A WEATHER STRIP

(75) Inventors: Ken Miura, Mie-ken (JP); Eiichi Sano, Mie-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 223 days.

(21) Appl. No.: 09/913,151

(22) PCT Filed: Apr. 3, 2001

(86) PCT No.: PCT/JP01/02883
§ 371 (c)(1),
(2), (4) Date: Jan. 10, 2002

(87) PCT Pub. No.: WO01/74541
PCT Pub. Date: Oct. 11, 2001

(65) Prior Publication Data
US 2002/0133929 A1 Sep. 26, 2002

(30) Foreign Application Priority Data
Apr. 4, 2000 (JP) ...................................... 2000-101694

(51) Int. Cl.$^7$ ................................................ B23P 11/02
(52) U.S. Cl. .............................. 29/450; 29/525; 29/235
(58) Field of Search .......................... 29/525, 235, 450, 29/451

(56) References Cited

U.S. PATENT DOCUMENTS

| | | | | |
|---|---|---|---|---|
| 3,505,725 A | * | 4/1970 | Curry | 29/451 |
| 4,172,313 A | * | 10/1979 | Takahashi | 29/235 |
| 4,996,756 A | * | 3/1991 | Bright et al. | 29/243.58 |
| 5,031,293 A | * | 7/1991 | Goedderz et al. | 29/235 |
| 5,048,170 A | * | 9/1991 | Kuppers | 29/235 |
| 5,065,486 A | * | 11/1991 | Goedderz | 292/35 |
| 5,067,225 A | * | 11/1991 | St. Angelo et al. | 29/451 |
| 5,068,952 A | * | 12/1991 | Hennen | 29/235 |
| 5,199,154 A | * | 4/1993 | Mesnel et al. | 29/451 |
| 5,274,895 A | * | 1/1994 | Mesnel et al. | 29/235 |

FOREIGN PATENT DOCUMENTS

| | | |
|---|---|---|
| JP | 61-92969 | 5/1986 |
| JP | 63-76424 | 5/1988 |
| JP | 10-109278 | 4/1998 |

* cited by examiner

Primary Examiner—David P. Bryant
(74) Attorney, Agent, or Firm—Sughrue Mion, PLLC (57) ABSTRACT

A guide portion is provided on an upper end of a fitting portion of a weather strip at a front portion of a body of the tool. A sealer member, into which a sealing portion of the weather strip is inserted and which possesses a press guide member for pressing the upper surface of the fitting portion is provided on a portion behind the guide member of the weather strip. A vibrator, which imparts the vibration to the sealer member, is stood on the sealer member.

11 Claims, 6 Drawing Sheets

TOOL AND PROCESS FOR PRESS-FITTING A WEATHER STRIP

FIELD OF THE INVENTION

The present invention relates to a tool and a process for press-fitting a weather strip into a flange, etc. a vehicle's door etc.

BACKGROUND ART

In a vehicle such as an automobile, a weather strip is intervened between a capping part such as a door or sunroof and a body of the vehicle so as to block the gap between the capping part and the body for the propose of preventing the immersion of rainwater, etc into the gap, and of blocking the zip. The weather strip possesses a fitting portion and a sealing portion. The fitting portion is pressed-in a flange formed along the side edge of the body, and due to the intervention of the sealing portion between the door etc. and the body when the door etc. is closed, the gap caused therebetween can be blocked.

In conventional art, as a process for press-fitting such a type of the weather strip, a process has been usually applied in which an operator holds the weather strip and presses-in the weather strip by his fingers, etc. However, in such a manual operation by the operator, a heavy load should be applied to the operator, for example, possibly resulting in trouble with the operator's finger(s), and lowering the operability.

In order to solve such a problem, for example, Japanese Utility Model Laid-Open No. 59-116181 discloses a device for providing a weather strip. The device for providing a weather strip disclosed therein possess a copying roller having circumferential groove, which can be engaged with the edge portion of the flange to be fit, placed on the outer circumference, and a presser roller having a circumfential groove, which can be engaged with the sealing portion of the weather strip, placed on the outer circumference. The device has means for keeping an orientation which keep a relative relationship between the copying roller and the presser roller in such a fashion that when the body of the device is moved along the flange to be fit, the copying roller is rolled on and copied the edge of the flange to be fit, and the presser roller applies pressure to said sealing portion so as to engage said fitting portion with the flange to be fit, while guiding said sealing portion.

According to Japanese Patent Laid-Open No. 10-109278, a process for fitting a weather strip is disclosed. In the process for fitting a weather strip disclosed therein is to move the weather strip forward under the condition that an opening of a holding portion of the weather strip is applied on the edge portion of a garnishing portion, while rotating the weather strips as the center of said opening.

However, in the device disclosed in Japanese Utility Model Laid-Open No. 59-116181, a pressing force is applied to the sealing portion by means of a motor at the time of press-fitting the fitting portion of the weather strip into the flange. Consequently, a motor having large torque is required as the motor to be used in press-fitting the weather strip. The use of the motor having a large torque makes the device large-sized. The large-sized device makes it difficult for the operator to keep the orientation of the device itself in a correct manner, leading to a problem associated with the operability. Furthermore, the device disclosed therein has a problem in terms of following-up properties when the flange is curved.

The process disclosed in Japanese patent Laid-open No. 10-109278 is to move the weather strip forward under the condition that an opening of a holding portion of the weather strip is applied on the edge portion of a garnish portion, while rotating the weather strip as the center of said opening. Consequently, a large pressure is similarly required in the press-fitting. For this reason, the device becomes a large-size, causing the problems associated therewith.

The present invention is intended to design a small-sized device for press-fitting a weather strip so as to enhance the operability of the device at the time of fitting the weather strip and to provide a device for press-fitting a weather strip which has an excellent following-up property even if the flange is curved.

DISCLOSURE OF THE INVENTION

The present invention, which attained the above objects, is a tool for press-fitting a weather strip comprising a guide member provided on a front portion of a body of the tool, which is supported in contact with an upper portion of a portion for fitting the weather strips;

a sealer member, into which a sealing portion of the weather strip is inserted and which possesses a press guide member for pressing the upper surface of the fitting portion of the weather strip, provided on a portion behind said guide member of weather strip;

said tool having a vibrator, which imparts the vibration to said sealer member, stood on said sealer member.

The tool for process for press-fitting the weather strip according to this aspect, there is provided a vibrator, which imparts the vibration to the sealer member. Because of press-fitting the weather strip to a flange etc. while vibrating the sealer member, the tool for press-fitting a weather strip of the present invention can securely press-fit a weather strip without requiring a large force. What is more, due to the configuration of the press-fitting tool where only the vibrator stands on the sealer member, the tool per se does not become a large-size, and the press-fitting tool has enhanced operability. Also, even if the flange is curved, the press-fitting tool can exhibit good flowing-up properties.

According to one preferred embodiment of the tool for press-fitting a weather strip, the vibrator is an air hammer.

In this preferred embodiment, an air hammer is used as the vibrator. Consequently, since the simplest member which imparts vibration tothe sealer member issued, the press-fitting tool can be further small-size as a whole.

According to another preferred embodiment, an electric hammer may be used as the vibrator. The use of an electric hammer as the vibrator makes it possible to vibrate the sealer member with good response.

Also, when a power source which drives the electric hammer is accommodated within the press-fitting tool, due to the unification of the press-fitting tool with power source, the operability of the press-fitting tool can be further enhanced.

DISCLOSURE OF THE INVENTION

Embodiments of the present invention will now be specifically described by referring to the attached drawings.

Figure 1:
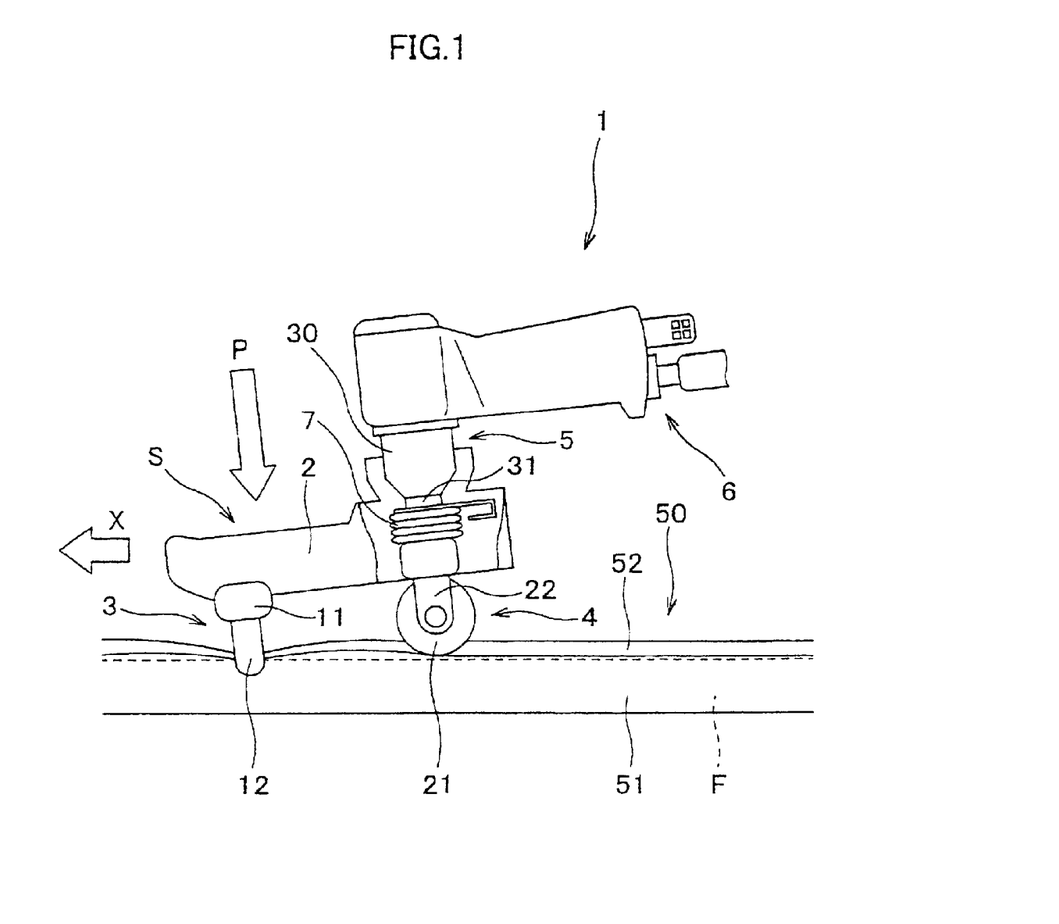
FIG. 1 is a partial cutaway view of the tool for press-fitting a weather strip according to the present invention.
Figure 2:
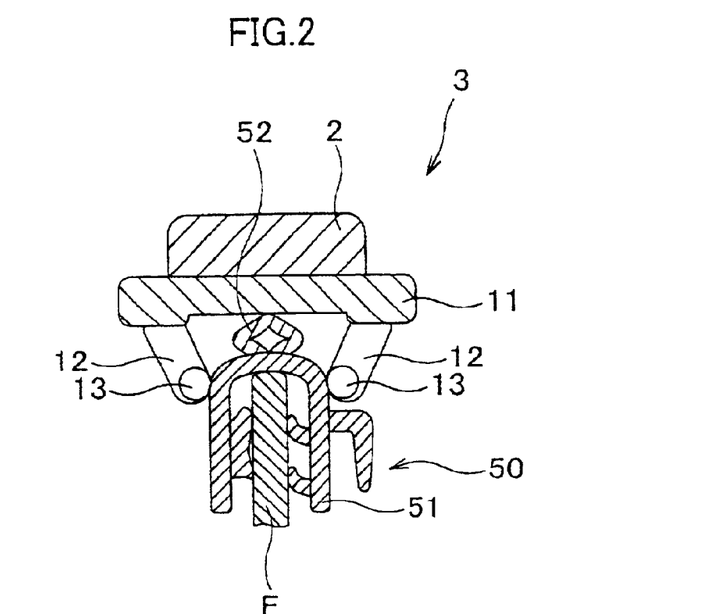
FIG. 2 is a lengthwise cross sectional view of a front portion of the body of the tool.
Figure 3:
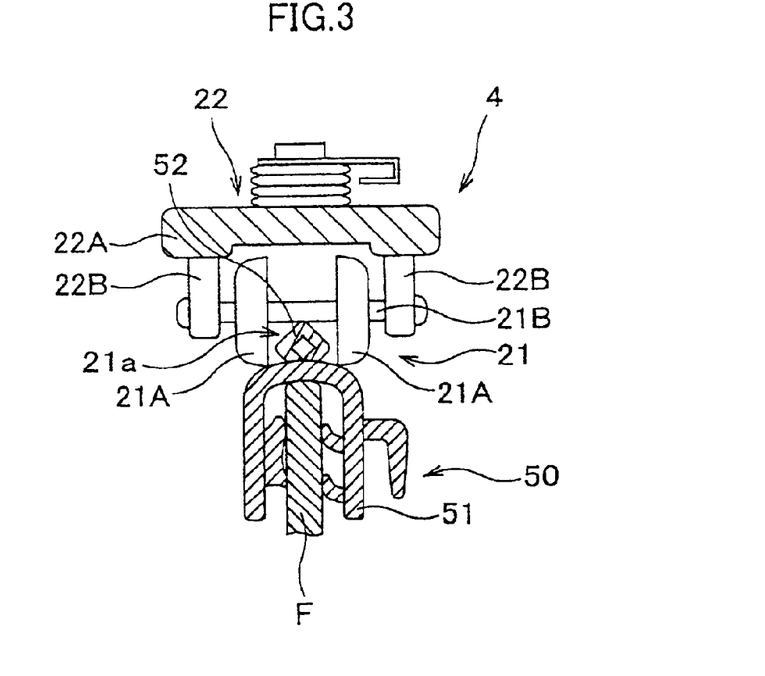
FIG. 3 is a lengthwise cross sectional view of a rear portion of the body of the tool.
Figure 4:
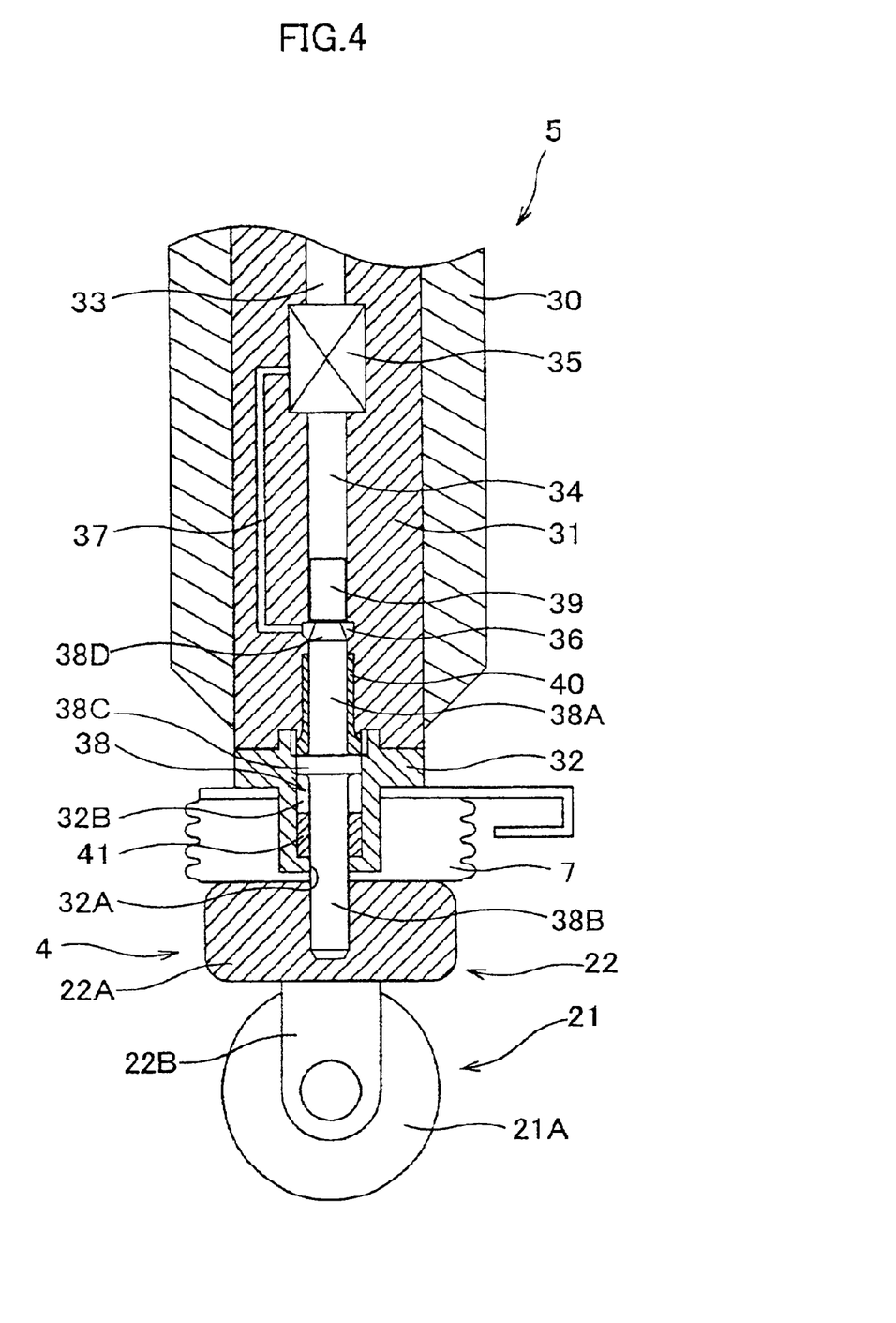
FIG. 4 is a lengthwise cross sectional view of an air hammer.

FIG. 1 is a partial cutaway view of the tool for press-fitting a weather strip according to the first embodiment of the present invention; FIG. 2 is a lengthwise cross sectional view of a front portion of the body of the tool; FIG. 3 is a lengthwise cross sectional view of a rear portion of the body of the tool; and FIG. 4 is a lengthwise cross sectional view of an air hammer.

As shown in FIG. 1, a tool 1 for press-fitting a weather strip according to the first embodiment of the present invention (hereinafter simply referred to as "press-fitting tool") possess a body 2 of the tool (hereinafter simply referred to as "body"). At front side portion of the body 2, a guide member 3 is placed and a sealer member 4 is placed at a potion behind the guide member 3. An air hammer 5 serving as a vibrator, which imparts vibration to the sealer, is stood on the sealer member 4.

As shown in FIGS. 1 and 2, the guide member 3 is fit to the body 2, and has a horizontal member 11, which extents toward a substantially horizontal direction. A pair of supporting members 12 and 12 are placed on both ends of the horizontal member 11, opposite this horizontal member 11. Balls 13 and 13 are fit to the tips of the supporting members 12 and 12 in a manner of being rotatable in horizontal and vertical directions. By contacting each one point of these balls 13 and 13, the supporting members 12 and 12 are come into contact with and supported on upper ends of a fitting portion 51 of a weather strip 50 to be press-fit into a flange F etc of vehicle. As shown in FIG. 1, at the upper face of the position on which the guide member 3 of the body 2 is placed, a space S for placing operator's hand is secured. By utilizing this space S, the operator can hold a front portion of the body 2, which makes it easy to press the balls 13 and 13 possessed by the guide member 3 onto the upper ends of the fitting portion 51 of the weather strip 50. A holding member may be placed for the purpose of placing the operator's hand.

As shown in FIGS. 1 and 3, the sealer member 4 possesses a guide roller 21, which is a guide member for pressing, and a holding member 22, which supports the guide roller 21 in a rotation manner. Two rollers 21A and 21A are placed on the guide roller 21 at a prescribed distance, and they are connected to a rotation shaft 21B. A through hole 21a into which a seal portion 52 is pierced is formed between these two rollers 21A and 21A. The lower ends of these rollers 21A and 21A are come into contact with and press the fitting portion 51 of the weather strip 50. Furthermore, the holding member 22 has a roof member 22A extending substantially horizontally, and shaft-supporting members 22B and 22B both downwardly extending from both ends of the roof member 22A. A rotation shaft 21B is pierced between the shaft-supporting members 22B and 22B so that the roller 21A and 21A of the guide roller 21 is supported in a ratatable manner.

As shown in FIGS. 1 and 4, the air hammer 5 has a rod 31 accommodated within a case 30, and a hollow cover 32 is fit to a lower end of the rod 31. Within the rod 31 is perforated a hollow portion composed of an air pore perforated from the upper portion of the center of the shaft and a through hole 34. An air pump (not shown) is connected to an upper portion of the air pore 33 so as to supply compressed air to the air pore 33. The through hole 34 is communicated with a hollow portion 32 B of the cover 32. A switching valve 35, which switches discharge of the compressed air, is placed between the air pore 33 and the through hole 34. An air chamber 36 is formed at a middle portion of the through hole 34, another air passage 37 from the switching valve 35 is connected to the air chamber 36. At a lower portion of the air chamber 36 of the through hole 34, a vibration hammer 38 is accommodated in vertically movable manner. The vibration hammer 38 possesses an upper rod 38A having a small diameter and a lower rod 38B also having a small diameter. A flange member 38C having a diameter larger than these of the upper and lower rods 38A and 38B is placed between the upper and lower rods 38A and 38B. A lower portion of the lower rod 38B protrudes from an opening 32A of the cover 32.

A vibration element 39 for vertically vibrating the vibration hammer 38 is accommodated within the through hole 34, and the lower end of the vibration element 39 is in contact with a base end 38D of the vibration hammer 38. A bush 40 coming into contact with the flange member 38C of the rod 38 is accommodated at a lower portion of the through hole 34 so as to restrict the upper limit of the vibration hammer 38. A cylindrical elastic collar 41 is inserted into the hollow portion 32B of the cover 32 in order to relax the impact of the vibration from the vibration hammer 38. The elastic collar 41, which can be preferably used, is one having frictional fatigue strength and not generating any force in directions other than the center of the shaft during the compression, including a rubber material such as urethane rubber.

A roof member 22A of the rotation holding member 22 in the sealer member 4 is fixed on the lower end of the lower rod 38B of the vibration hammer 38. As described above, the air hammer 5 is configured so that the sealer member 4 is vertically vibrated through the vibration of the vibration hammer 38. At the upper end of the air hammer 5, a grip member 6 to be held by the operator during the operation is provided. A flexible guide 7 is provided between the sealer member 4 and the air hammer 5 in order to prevent the incorporated of dusts etc. into the air hammer 5.

Next, the operation of the press-fitting tool 1 having the configuration as described above will now be described.

When the weather strip 50 is press-fit into the flange F of the vehicle, the operator lightly inserts the weather strip 50 along the flange F in advance. At this state, the weather strip 50 is press-fit by utilizing the press-fitting tool 1 according to this embodiment.

Subsequently, when the press-fitting operation is carried out, the press-fitting tool 1 is pressed on the weather strip, having slightly inserted into the flange F, from an upper side. The balls 13 and 13 of the guide member 3 are come into contact with and supported onto the upper end of the fitting portion 51 of the weather strip 50. At this time, the sealing member 52 of the weather strip is inserted into the through hole 21a formed between the roller 21A and 21A in sealer member 4, and is brought into contact with the upper face of the fitting portion 51 of the weather strip 50. This is ready for press-fitting operation by means of the press-fitting tool 1 is completed. At this time, the sealer member 4 upwardly moves to ascend the vibration element 39, which is in contact with the base end 38D of the vibration hammer 38 in the air hammer 5, to the position of the air chamber 36.

When being ready for the press-fitting operation, the operator holds the grip member 6 by one hand. The operator puts another hand on the space S secured on an upper portion of the guide member 3, and applies slight pressure P as shown FIG. 1 as an arrow. Subsequently, the operator turns on a switch (not shown) for the air hammer 5 to supply compressed air into the air pore 33. Thereafter, the compressed air supplied from the air pore 33 is supplied into the air chamber 36 via the air passage 37 by means of the switching valve 35 to thereby ascend the vibration element 39. Thereafter, the switching valves 35 is switched to supply the compressed air into the through hole 34 to thereby descend the vibration element 39 by the presser of compressing air to apply impact force to the base end 38D of the vibration hammer 38.

This cycle is repeated by the actuation of the switching valve 35 to vibrate the vibration element 39, this vibration, is in turn, transmitted to the vibration hammer 38 to vibrate the sealer member 4 fixed on the lower rod 38B. Once the sealer member 4 vibrates, the vibration is transmitted to the fitting portion 51 of the weather strip 50. The fitting portion 51 of the weather strip 50 can be securely press-fit into the flange F through this vibration. Since the sealing member 52 of the weather strip is inserted into the through hole 21a formed between the rollers 21A and 21A in the sealer member 4, the vibration can be securely imparted to the course of imparting the vibration to the fitting portion 51 of the weather strip 50.

In addition, the operator moves the press-fitting tool 1 forward along to the flange F in the direction X shown in FIG. 1 in order to press-fit the weather strip 50 into other portion. When moving the press-fitting tool 1 forward, the operator applies slight downward pressure P to the body 2 while holding the space S secured on an upper portion of a guide member 3. Also, the ball 13 and 13 of the guide member 3 moves while coming into contact with the upper end of the fitting portion 51 of the weather strip 50. What is more, since the balls 13 and 13 can freely move in any of vertical and horizontal directions, the press-fitting tool 1 can easily and securely moves forward. This makes the operability very ease. Also, since the operator can only moves the guide member 3 along the flange F, the press-fitting operation can easily be carried out even if the flange F is curved.

As described above, the air hammer 5 is driven even when the press-fitting tool 1 is moved and the air hammer 5 imparts the vibration to the fitting portion 51 of the weather strip 50 via the sealing member 4. Consequently, since the vibration is continuously imparted to the weather strip 50 in the lengthwise direction, the weather strip 50 can be securely press-fit into the flange F as a whole.

Next, the second embodiment of the present invention will now be described.

In this embodiment, an electric hammer is used for the vibration of the sealer and any other configurations are the same as those of the first embodiment. Consequently, only the configuration of the electric hammer will be described and other description will be omitted.

Figure 5:
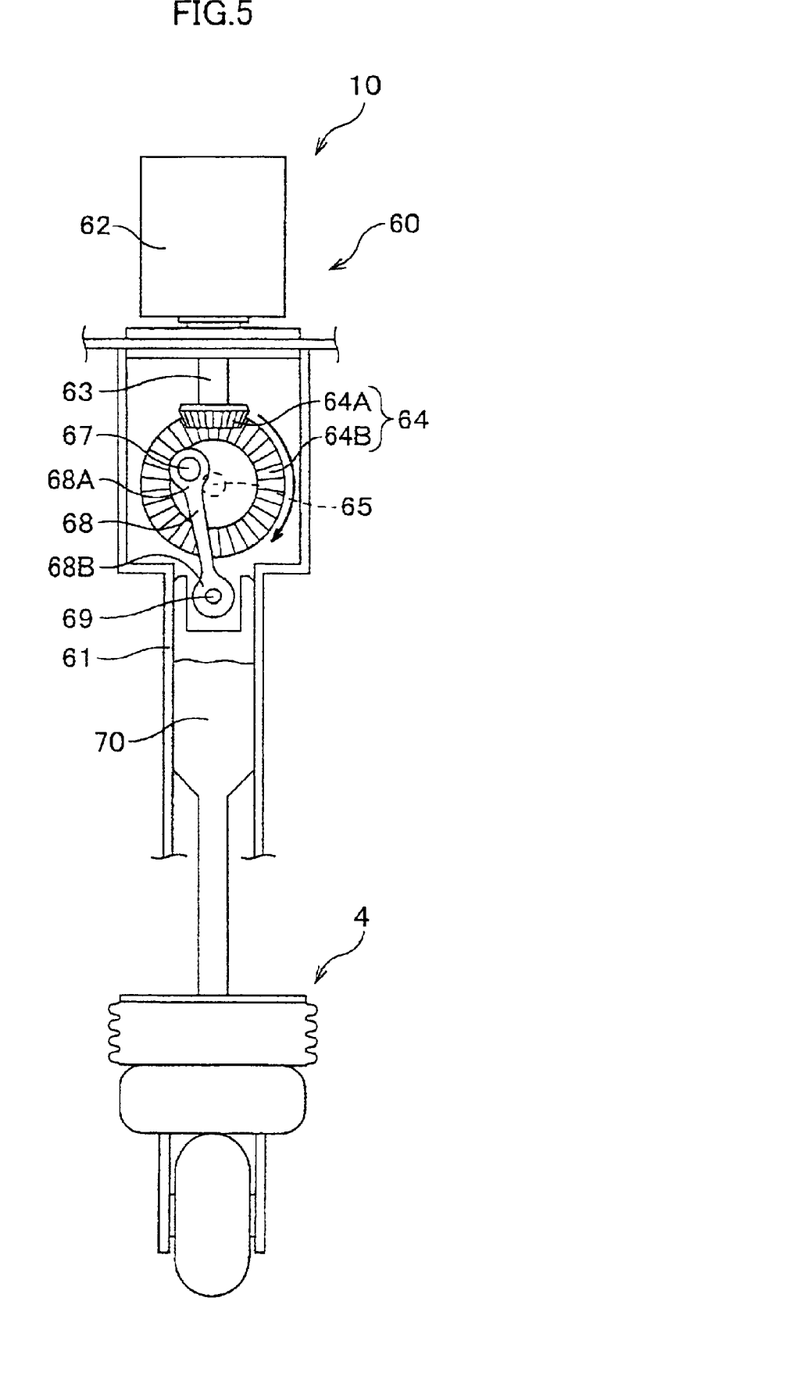
FIG. 5 is a lengthwise cross sectional side view of an electromagnetic hammer.
Figure 6:
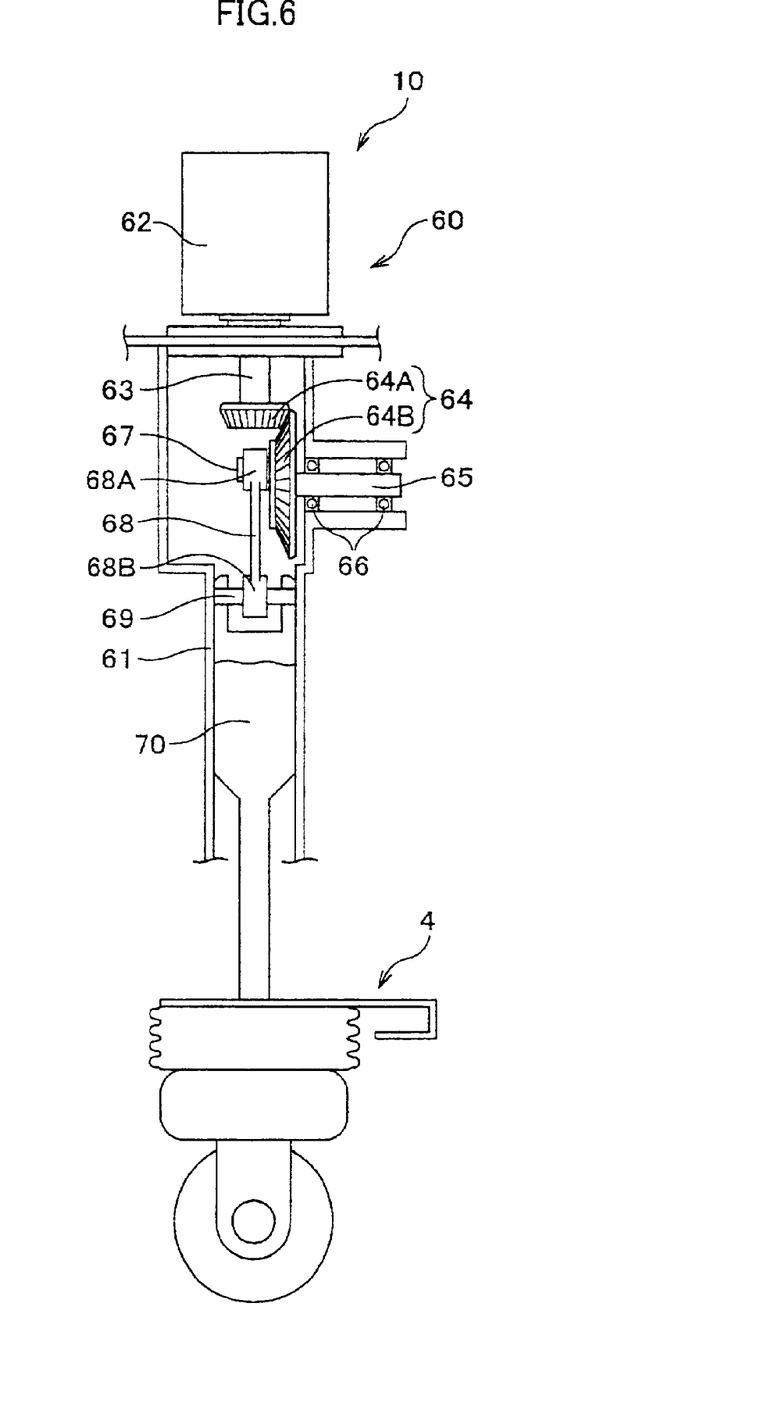
FIG. 6 is a lengthwise cross sectional front view of an electric hammer.

As shown in FIGS. 5 and 6, the press-fitting tool 10 according to this embodiment possesses an electric hammer 60 as the vibrator. The electric hammer 60 possesses a case 61 and an electric motor 62 provided on an upper portion of the case 61. The electric motor 62 has a rotation shaft 63, which rotates around the vertical axis. The rotation shaft 63 extends to the interior of the case 61, and a first gear 64A of a bevel gear 64, making up the rotation mechanism of the present invention, is fit to the edge of the rotation shaft 63.

A second gear 64B which is engaged with the first gear 64A is fit to an edge of a crankshaft 65. The crankshaft 65 is fit via bearing 66, 66, . . . to the case 61 in a freely rotatable manner.

A pin 67 is provided on the surface of the second gear 64B, and one end 68A of a rod 68, making up the crank mechanism of the present invention, is fit to the pin 67. This crank mechanism converts the rotation drive of the bevel gear 64 into linear drive. One end 68A of the rod 68 is in a ring form as shown in FIG. 6. A pin 67 in inserted into one end 68A with a clearance. This clearance rotates one end 68A of the rod 68 relative to the pin 67. Other end 68B of the rod 68 is in a ring form similar to one end 68A of the rod 68, and a drive pin 69 is inserted into other end 68B. The drive pin 69 is fixed onto an upper portion of a derive piston 70, and the sealer member 4 is fit to a lower portion of the drive piston 70.

Figure 7:
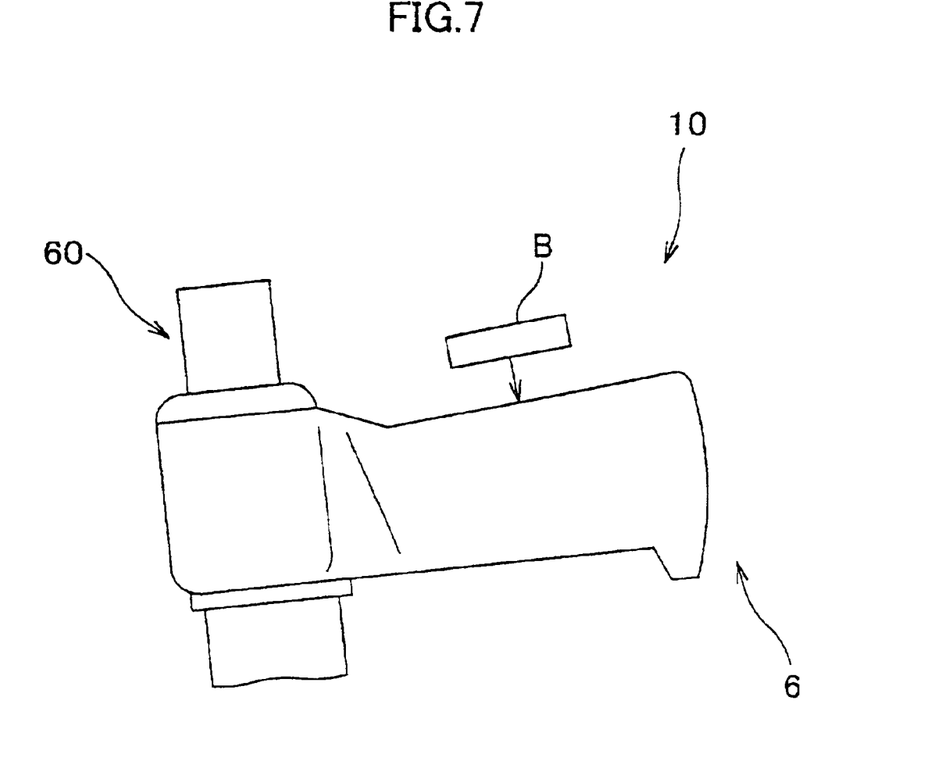
FIG. 7 is a drawing illustrating a battery accommodated within the grip member.

As shown in FIG. 7, a grip 6 of the press-fitting tool 10 has a power source, e.g., a battery B, accommodated therein. A storage space (not shown) is formed within the grip 6; thus, the battery B is stored within this storage space and is accommodated within the grip 6. The battery thus B accommodated supplies electric power to drive the electric hammer 60.

By such a configuration, when current is supplied from a power source (not shown), e. g., a battery, to the electric motor 62 to rotate the electric motor 62, the rotation force is transmitted to the bevel gear 64. A rod 68 is fit to the second gear 64B of the bevel gear 64, and the rotation drive of the bevel gear 64 is converted into linear drive, which is transmitted to the drive piston 70 as vertical vibration so as to vertically vibrate the sealer member 4. For this reason, by the rotation of the electric motor 62, the sealer member 4 can be vertically rotated via the bevel gear 64 and the rod 68.

In this embodiment, since a power source such as a battery is provided in a detachable manner for use in the electric motor, the power source can be unified with the press-fitting tool, making it possible to further enhance the operability of the press-fitting tool. It is needless to say that when the electric power is consumed, the power source can be exchanged or charged.

Since the electric hammer is used as the vibrator in this embodiment, the press-fitting tool has response better than that in the case of using the air hammer.

INDUSTRIAL APPLICABILITY

As described above, a weather strip can be securely press-fit without requiring any large force. What is more, the press-fitting tool per se does not become a large-size, and the press-fitting tool has enhanced operability. Also, even if the flange is curved, the press-fitting tool can exhibit good flowing-up properties.

Since the simplest member which imparts vibration to the sealer member is used, the press-fitting tool can be further small-sized as a whole.

Also, the use of an electric hammer as the vibrator makes it possible to vibrate the sealer member with good response. Also, when a power source which drives the electric hammer is accommodated within the press-fitting tool, due to the unification of the press-fitting tool with the power source, the operability of the press-fitting tool can be further enhanced.

While the preferred embodiments of the present invention have been described, the present invention is not restricted to such preferred embodiments. For example, while the guide roller is used as the guide member for pressing, a member which is not rotated can also be used. Further, balls have been fit to the guide member in the preferred embodiments; the fitting of any ball is not essential.

What is claimed is:

1. A tool for press-fitting a weather strip comprising:
   a guide member provided on a front portion of a body of the tool, which is supported in contact with an upper portion of a fitting portion of the weather strip;
   a sealer member, into which a sealing portion of the weather strip is inserted and which possesses a press guide member for pressing the upper portion of the fitting portion of the weather strip, provided on a portion behind said guide member of weather strip;
   said tool having a vibrator, which imparts a vibration to said sealer member, stood on said sealer member,
   wherein said press guide member comprises a plurality of rollers for pressing opposite sides of the upper portion of the fitting portion,
   wherein the guide member comprises a pair of support members having at least one ball fit to each end of the support members, such that the balls are capable of rotating in a horizontal and vertical direction.

2. The tool for press-fitting a weather strip as claimed in claim 1, wherein said vibrator is an air hammer.

3. The tool for press-fitting a weather strip as claimed in claim 2, wherein said air hammer comprises a vibration hammer which vibrates said sealer member and a vibration element which is moved by air to vibrate said vibration hammer.

4. The tool for press-fitting a weather strip as claimed in claim 1, wherein said vibrator is an electric hammer.

5. The tool for press-fitting a weather strip as claimed in claim 4, wherein said electric hammer comprises an electric motor, a rotation mechanism which is rotated by said electric motor, a crank mechanism which is rotated by said electric motor to convert the rotation drive in said rotation mechanism into a linear drive, and a vibration hammer which is vertically moved by said crank mechanism to vibrate said sealer member.

6. The tool for press-fitting a weather strip as claimed in claim 4, which has a power source which drives said electric hammer.

7. The tool for press-fitting a weather strip as claimed in claim 5, which has a power source which drives said electric hammer.

8. A process for press-fitting a weather strip which comprises press-fitting the weather strip into a member to be press-fit utilizing the tool for press-fitting a weather strip as claimed in any one of claims 1 to 7.

9. The tool for press-fitting a weather strip as claimed in claim 7, wherein said power source is a detachable battery.

10. The tool for press-fitting a weather strip as claimed in claim 6, wherein said power source is a detachable battery.

11. The tool for press-fitting a weather strip as claimed in claim 1, wherein said is a hand-held tool.

* * * * *